US012627016B2

(12) United States Patent
Hwang et al.

(10) Patent No.: US 12,627,016 B2
(45) Date of Patent: May 12, 2026

(54) BATTERY MODULE

(71) Applicant: SK ON CO., LTD., Seoul (KR)

(72) Inventors: Chang Mook Hwang, Daejeon (KR);
Kyung Tae Park, Daejeon (KR);
Kyeong Min Lee, Daejeon (KR)

(73) Assignee: SK On Co., Ltd., Seoul (KR)

( * ) Notice: Subject to any disclaimer, the term of this
patent is extended or adjusted under 35
U.S.C. 154(b) by 738 days.

(21) Appl. No.: 18/081,336

(22) Filed: Dec. 14, 2022

(65) Prior Publication Data

US 2023/0187796 A1     Jun. 15, 2023

(30) Foreign Application Priority Data

Dec. 15, 2021     (KR) ........................ 10-2021-0179641

(51) Int. Cl.
| | |
|---|---|
| *H01M 50/609* | (2021.01) |
| *H01M 10/613* | (2014.01) |
| *H01M 10/647* | (2014.01) |
| *H01M 10/654* | (2014.01) |
| *H01M 10/6554* | (2014.01) |
| *H01M 10/052* | (2010.01) |

(Continued)

(52) U.S. Cl.
CPC ....... *H01M 50/609* (2021.01); *H01M 10/613*
(2015.04); *H01M 10/647* (2015.04); *H01M
10/654* (2015.04); *H01M 10/6554* (2015.04);
*H01M 10/052* (2013.01); *H01M 10/6556*
(2015.04); *H01M 50/682* (2021.01); *Y02E
60/10* (2013.01)

(58) Field of Classification Search
CPC ............. H01M 10/052; H01M 10/613; H01M
10/647; H01M 10/654; H01M 10/6554;
H01M 10/6556; H01M 50/609; H01M
50/682; Y02E 60/10
See application file for complete search history.

(56) References Cited

U.S. PATENT DOCUMENTS

| | | | |
|---|---|---|---|
| 6,955,187 | B1 | 10/2005 | Johnson |
| 10,205,137 | B2 | 2/2019 | Uhm et al. |
| 2014/0154554 | A1 | 6/2014 | Kim et al. |

(Continued)

FOREIGN PATENT DOCUMENTS

| | | |
|---|---|---|
| CN | 209291117 U | 8/2019 |
| CN | 112350011 A | 2/2021 |

(Continued)

OTHER PUBLICATIONS

Extended European Search Report issued by the EPO on May 30, 2023.

(Continued)

*Primary Examiner* — Lingwen R Zeng
(74) *Attorney, Agent, or Firm* — IP & T GROUP LLP

(57)     ABSTRACT
A battery module includes a cell stack including a plurality of a battery cell, a module case at least partially accommodating the cell stack, and a cooling unit disposed at one side of the cell stack. The battery cell includes a cell case, an electrode assembly and an electrolyte accommodated in the cell case, and an electrolyte storage unit inserted into the cell case to supply a supplementary electrolyte. The electrolyte storage unit is disposed between the electrode assembly and the cooling unit in a cross-sectional view.

17 Claims, 6 Drawing Sheets

(51) Int. Cl.
　　*H01M 10/6556*　　　(2014.01)
　　*H01M 50/682*　　　(2021.01)

(56)　　　　　　　References Cited

U.S. PATENT DOCUMENTS

2015/0147622 A1*　5/2015　Hwang ............. H01M 10/6567
　　　　　　　　　　　　　　　　　429/120
2015/0287548 A1　10/2015　Hecht

FOREIGN PATENT DOCUMENTS

| | | | |
|---|---|---|---|
| JP | 2009076248 | A | 4/2009 |
| JP | 2015-172997 | A | 10/2015 |
| KR | 10-2011-0132856 | A | 12/2011 |
| KR | 10-2012-0069297 | A | 6/2012 |
| KR | 10-2013-0021784 | A | 3/2013 |
| KR | 10-2013-0038655 | A | 4/2013 |
| KR | 10-2020-0050782 | A | 5/2020 |
| KR | 10-2020-0101745 | A | 8/2020 |

OTHER PUBLICATIONS

Office Action for Korean Patent Application No. 10-2021-0179641 issued by the Korean Patent Office on Jan. 9, 2026.

\* cited by examiner

BATTERY MODULE

CROSS-REFERENCE TO RELATED APPLICATION

This application claims priority to Korean Patent Application No. 10-2021-0179641 filed on Dec. 15, 2021 in the Korean Intellectual Property Office (KIPO), the entire disclosure of which is incorporated by reference herein.

BACKGROUND

1. Field

The present invention relates to a battery module. More particularly, the present invention relates to a battery module including a plurality of battery cells.

2. Description of the Related Art

A secondary battery which can be charged and discharged repeatedly includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, a low-capacity lithium secondary battery may be used as a power source for a small electronic device such as a cellular phone, a laptop computer, a camcorder, etc. A high-capacity lithium secondary battery may be used as a power source for a large electronic device such as an electric vehicle, a hybrid vehicle, etc.

For example, the lithium secondary battery may include an electrode assembly including repeatedly stacked cathodes and anodes, and an electrolyte immersing the electrode assembly. The lithium secondary battery may further include a case (e.g., a pouch-type cell case) for accommodating the electrode assembly and the electrolyte.

The lithium secondary battery may be defined as a battery cell, and a battery module may be formed by accommodating a plurality of the battery cells in a case (module case).

For example, the battery cell may be charged and discharged through an electrochemical reaction of the cathode, the anode, and the electrolyte.

When the lithium secondary battery is repeatedly charged and discharged, the electrolyte may be transformed due to a side reaction, and an amount of the electrolyte in the battery cell may be gradually reduced. Accordingly, a capacity retention of the battery cell may also be gradually decreased, thereby reducing a life-span of the battery module.

For example, Korean Published Patent Application No. 10-2011-0132856 discloses a method of replenishing an electrolyte in a lithium secondary battery.

SUMMARY

According to an aspect of the present invention, there is provided a battery cell having improved operational stability and life-span.

A battery module includes a cell stack including a plurality of a battery cell, a module case at least partially accommodating the cell stack, and a cooling unit disposed at one side of the cell stack. The battery cell includes a cell case, an electrode assembly and an electrolyte accommodated in the cell case, and an electrolyte storage unit inserted into the cell case to supply a supplementary electrolyte. The electrolyte storage unit is disposed between the electrode assembly and the cooling unit in a cross-sectional view.

In some embodiments, an outer surface of the electrolyte storage unit facing the cooling unit may have a flat surface.

In some embodiments, the flat surface of the electrolyte storage unit and a bottom surface of the cell case are in a surface-contact, and the bottom surface of the cell case and a top surface of the cooling unit are in a surface-contact in the cross-sectional view.

In some embodiments, the bottom surface of the cell case may be a non-sealing surface.

In some embodiments, the electrolyte storage unit may have a polygonal column shape.

In some embodiments, a longitudinal direction of the electrode assembly and a longitudinal direction of the electrolyte storage unit may be parallel.

In some embodiments, the electrolyte storage unit may include a first unit including a first body and first holes formed through the first body, the first body having an outer shape of a polygonal column and a tubular hollow structure, and a sub-unit including a tubular body and sub-holes formed through the tubular body. The sub-unit may be inserted into the first unit so that the sub-holes may be offset from the first holes.

In some embodiments, the sub-unit may include a first sub-unit and a second sub-unit which are inserted into both end portions of the first unit.

In some embodiments, the first sub-unit and the second sub-unit may be disposed in the first unit to be spaced apart from each other in a longitudinal direction of the first unit.

In some embodiments, the first sub-unit and the second sub-unit may be movable by an external force in the longitudinal direction so that at least one of the sub-holes may overlap at least one of the first holes.

In some embodiments, the electrolyte storage unit may further include a first packing unit coupled to one end portion of the first sub-unit, and a second packing unit coupled to one end portion of the second sub-unit.

In some embodiments, the electrolyte storage unit further includes a second unit that includes a second body having a tubular structure and second holes formed through the second body. The second unit may be inserted between the first unit and the sub-unit so that at least one of the second holes may overlap at least one of the first holes.

In some embodiments, the second holes may be arranged to be offset from the sub-holes.

In some embodiments, an inner surface of the first body and an outer surface of the second body may have screw structures to be fastened to each other.

In some embodiments, the first unit may have a first coefficient of thermal expansion, and the second unit may have a second coefficient of thermal expansion different from the first coefficient of thermal expansion.

In some embodiments, the first unit may have a first coefficient of thermal expansion, and the second unit may have a second coefficient of thermal expansion different from the first coefficient of thermal expansion. The second unit may be physically separable from the first unit at a temperature of −20° C. or less, or 40° C. or higher.

In some embodiments, the cell case may include a first space accommodating the electrode assembly and the electrolyte, a second space into which the electrolyte storage unit is inserted, and a passage portion through which the supplementary electrolyte is capable of being transferred between the first space and the second space.

In some embodiments, the passage portion may include a sealing line portion that is capable of being opened by a pressure due to a discharge of the supplementary electrolyte.

A battery module according to exemplary embodiments may include a plurality of a battery cell. The battery cell may include a cell case, an electrode assembly and an electrolyte accommodated in a main-chamber of the cell case, and an electrolyte storage unit including a supplementary electrolyte. When the electrolyte of the battery cell is consumed, the electrolyte may be compensated by the electrolyte storage unit. Accordingly, the battery module may have improved life-span properties.

In some embodiments, an outer surface of the electrolyte storage unit may include a flat surface. The flat surface of the electrolyte storage unit may be disposed to face a cooling unit in the battery unit. Accordingly, the battery module may have improved cooling efficiency.

DETAILED DESCRIPTION OF THE EMBODIMENTS

According to embodiments of the present invention, a battery module including a plurality of battery cells is provided. Hereinafter, for convenience of descriptions, the battery cell will be described, and then the battery module will be described.

Battery Cell

Hereinafter, the battery cell according to embodiments of the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
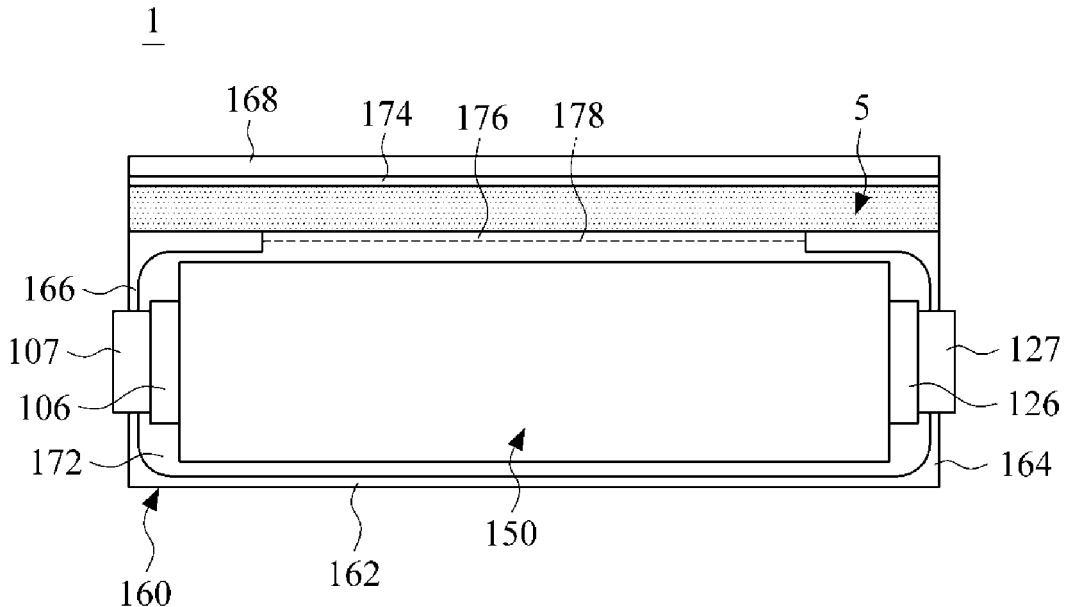
FIG. 1 is a schematic projected plan view of a battery cell according to exemplary embodiments.

Referring to FIG. 1, a battery cell 1 includes an electrode assembly 150; an electrolyte (not illustrated) impregnating the electrode assembly 150; an electrolyte storage unit 5 containing a supplementary electrolyte; and a cell case 160 accommodating the electrode assembly 150, the electrolyte and the electrolyte storage unit 5. For example, the electrolyte storage unit 5 may be inserted into the cell case 160 to be adjacent to the electrode assembly 150.

In an embodiment, the cell case 160 may include a first space 172 accommodating the electrode assembly 150 and the electrolyte, and a second space 174 into which the electrolyte storage unit 5 is inserted.

In some embodiments, the cell case 160 may further include a passage portion 176 between the first space 172 and the second space 174. For example, the supplementary electrolyte accommodated in the electrolyte storage unit 5 may be transferred to the first space 172 though the passage portion 176.

In an embodiment, the first space 172 and the second space 174 may extend to face each other in the cell case 160. The electrode assembly 150 and the electrolyte storage unit 5 may extend to face each other.

In an embodiment, as illustrated in FIG. 1, a longitudinal direction of the electrode assembly 150 and a longitudinal direction of the electrolyte storage unit 5 may be parallel to each other.

For example, the longitudinal direction of the electrode assembly 150 may refer to a direction parallel to a long side direction of a cathode (or an anode).

For example, the longitudinal direction of the electrolyte storage unit 5 may refer to a direction parallel to a direction in which the electrolyte storage unit 5 is inserted into the cell case 160. For example, a longitudinal direction of the first unit 10, a longitudinal direction of a second unit 20, and a longitudinal direction of sub-units (a first sub-unit and a second sub-unit) described later may refer to a direction parallel to the direction in which the electrolyte storage unit 5 is inserted into the cell case 160.

In an embodiment, the second space 174 may extend in the longitudinal direction of the electrode assembly 150. In an embodiment, a length of the electrode assembly 150 in the longitudinal direction and a length of the electrolyte storage unit 5 in the longitudinal direction may be equivalent to each other.

In an embodiment, a height of the first space 172 and a height of the electrolyte storage unit 5 may be substantially the same. In this case, the battery cell 1 may have a constant or uniform thickness. In an embodiment, if the battery cell 1 includes the passage portion, the battery cell 1 may have the same thickness in a region excluding the passage portion.

In an embodiment, the cell case 160 may be a pouch type case, and may include four peripheral sides. In some embodiments, the peripheral sides may include three sealing portions 162, 164 and 166 and a non-sealing portion 168. For example, the non-sealing portion 168 may be formed by folding one sheet.

For example, the first space 172 may include an enclosed space. For example, the second space 174 may include an enclosed space or a space in which at least one side is opened.

For example, an outer surface of the electrolyte storage unit 5 (e.g., an outer surface of the first unit) may be in a close contact with an inner surface of the second space 174 so that the supplementary electrolyte may not be leaked to an outside of the cell case 160.

The electrolyte storage unit 5 may include a first unit 10 and a sub-unit inserted into the first unit 10.

Figure 2:
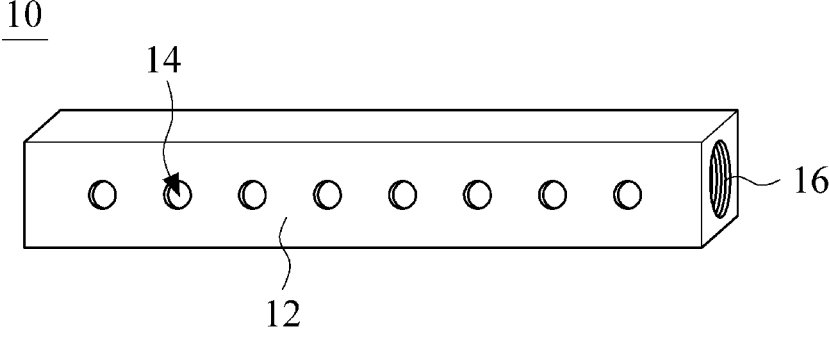
FIG. 2 is a schematic perspective view of a first unit according to exemplary embodiments.

Referring to FIG. 2, the first unit 10 may include a first body 12 having a tubular or hollow structure and first holes 14 formed in the first body 12. For example, the first body 12 may have a tubular hollow structure in which both ends are open. For example, at least one of the first holes 14 may be connected to the passage portion 176.

In an embodiment, at least a portion of an outer surface of the first body 12 may include a flat region formed along the longitudinal direction of the first unit 10. At least a portion of the outer surface of the first body 12 may also include a curved region.

In some embodiments, the first body 12 may have an outer shape of a polygonal column (in this specification, the polygonal column also refer to a shape where an outer surface has a curvature. However, at least one outer surface has a flat shape). In some embodiments, the first body 12 may have a quadrangular column shape.

In some embodiments, the first holes 14 may be formed in a line or in series in the first body 12 along the longitudinal direction of the first unit 10.

The sub-unit may include a body having a tubular structure (hereinafter, abbreviated as a tubular body) and sub-holes formed in the tubular body. The sub-unit may be inserted into the first unit 10 such that the sub-holes may be offset from or may not overlap the first holes 14. Accordingly, an enclosed space may be formed in the first unit 10 and the sub-unit. The supplementary electrolyte may be accommodated in the enclosed space.

In some embodiments, the sub-holes may be formed in a line or in series in the tubular body along the longitudinal direction of the sub-unit.

Figure 3:
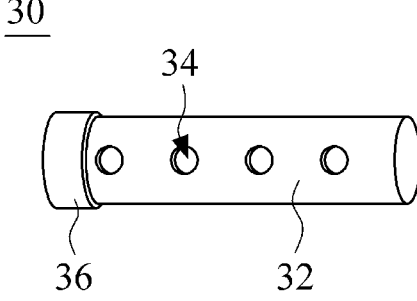
FIGS. 3 and 4 are schematic perspective views of a first sub-unit and a second sub-unit, respectively, according to exemplary embodiments.
Figure 4:
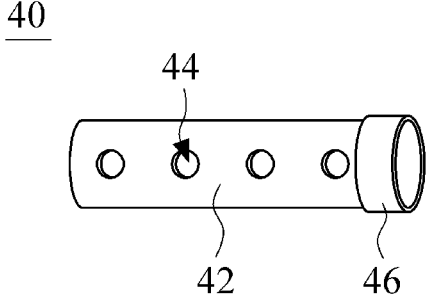

Referring to FIGS. 3 and 4, the sub-unit may include a first sub-unit 30 and a second sub-unit 40. For example, the first sub-unit 30 and the second sub-unit 40 may each be inserted into both ends of the first unit 10.

In some embodiments, the first sub-unit 30 and the second sub-unit 40 may be disposed in the first unit 10 to be spaced apart from each other in the longitudinal direction of the first unit 10.

The first sub-unit 30 may include a first tubular body 32 and first sub-holes 34 formed in the first tubular body 32. For example, the first tubular body 32 may have a tubular structure in which one end is closed and the other end (an end opposite to the one end in the longitudinal direction) is opened.

In some embodiments, the first sub-holes 34 may be formed in a line or in series in the first tubular body 32 along the longitudinal direction of the first sub-unit 30.

The second sub-unit 40 may include a second tubular body 42 and second sub-holes 44 formed in the second tubular body 42. For example, the second tubular body 42 may have a tubular structure in which one end is closed and the other end is opened.

In some embodiments, the second sub-holes 44 may be formed in a line or in series in the second tubular body 42 along the longitudinal direction of the second sub-unit 40.

Figure 5:
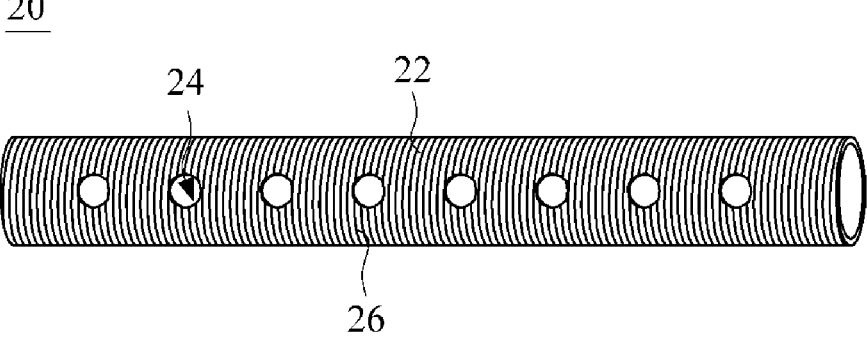
FIG. 5 is a schematic perspective view of a second unit according to exemplary embodiments.

Referring to FIG. 5, the electrolyte storage unit 5 may further include a second unit 20 inserted between the first unit 10 and the sub-units.

The second unit 20 may include a second body 22 having a tubular structure and second holes 24 formed in the second body 22. For example, the second body 22 may have a tubular structure in which both ends are opened.

In some embodiments, the second holes 24 may be formed in a line or in series in the second body 22 along the longitudinal direction of the second unit 20.

Figure 6:
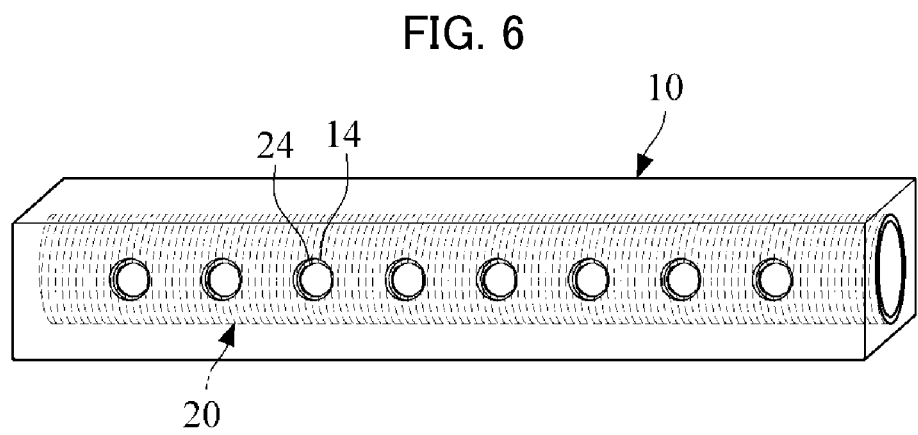
FIG. 6 is a perspective view schematically illustrating a construction in which a second unit is inserted into a first unit according to exemplary embodiments.

Referring to FIG. 6, the second unit 20 may be inserted into the first unit 10 such that at least one of the second holes 24 overlaps at least one of the first holes 14. The sub-units 30 and 40 (not illustrated in FIG. 6) may be inserted into the second unit 20. Accordingly, the second unit 20 may be disposed between the first unit 10 and the sub-unit.

In some embodiments, as illustrated in FIG. 6, the first unit 10 and the second unit 20 may include the same number of holes. For example, the first holes 14 and the second holes 24 may be disposed to overlap each other.

Figure 7:
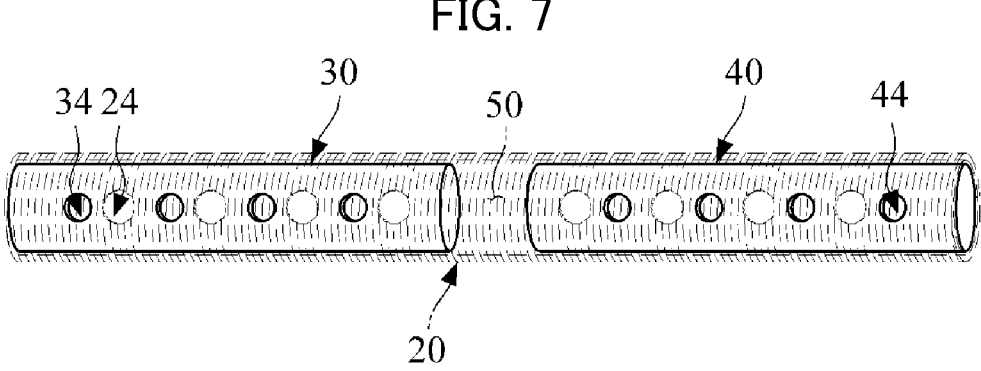
FIG. 7 is a perspective view schematically illustrating a construction in which a first sub-unit and a second sub-unit are inserted into a second unit according to exemplary embodiments.

Referring to FIG. 7, the first sub-unit 30 and the second sub-unit 40 may be inserted into the second unit 20. For example, the first sub-unit 30 and the second sub-unit 40 may each be inserted from both ends of the second unit 10. For example, the first sub-unit 30 and the second sub-unit 40 may be disposed in the second unit 20 to be spaced apart from each other in the longitudinal direction of the second unit 20.

In some embodiments, the first holes 14, the second holes 24, the first sub-holes 34 and the second sub-holes 44 may be arranged in a line or in series along the longitudinal direction of the first unit 10.

For example, the enclosed one end of the first sub-unit 30 and the enclosed one end of the second sub-unit 40 may be disposed to face the outside of the cell case 160. For example, the second holes 24, the first sub-holes 34 and the second sub-holes 44 may be offset from each other. Accordingly, an enclosed space 50 may be formed in the second unit 20, the first sub-unit 30 and the second sub-unit 40. The supplementary electrolyte may be accommodated in the enclosed space 50.

In an embodiment, as illustrated in FIG. 3, the first sub-unit 30 may include a first packing unit 36 coupled to one end portion thereof. In some embodiments, the first packing unit 36 may be disposed on an outer surface of the closed one end portion of the first tubular body 32. For example, the first packing portion 36 may be disposed between the second unit 20 and the first sub-unit 30. An airtightness of the enclosed space 50 may be improved by the first packing unit 36.

In some embodiments, the first packing unit 36 may surround an outer surface of the enclosed one end portion of the first tubular body 32.

In an embodiment, as illustrated in FIG. 4, the second sub-unit 40 may include a second packing unit 46 coupled to one end portion thereof. In some embodiments, the second packing unit 46 may be disposed on an outer surface of the closed one end portion of the second tubular body 42. For example, the second packing unit 46 may be disposed between the second unit 20 and the second sub-unit 40. An airtightness of the enclosed space 50 may be improved by the second packing unit 46.

In some embodiments, the second packing unit 46 may surround an outer surface of the closed one end portion of the second tubular body 42.

In some embodiments, each of the first sub-unit 30 and the second sub-unit 40 may have a packing unit coupled to an end portion opposite to the one end portion (i.e., the other end portion). Accordingly, the airtightness of the closed space 50 may be further improved.

In an embodiment, the packing unit may include an elastic material. In some embodiments, the elastic material may include a natural rubber, a synthetic rubber or an elastomer.

For example, the elastomer may include a polyolefin-based elastomer, a urethane-based elastomer, a styrene-based block copolymer, a vinyl chloride elastomer, a chlorinated polyethylene elastomer, a polyester-based elastomer, a polyamide-based elastomer, a fluorine-based elastomer, silicone-based elastomers, etc. Preferably, a material having chemical resistance to the electrolyte may be used.

In an embodiment, the material of the packing unit may include the polyolefin-based resin. For example, the polyolefin-based resin may include polyethylene, etc.

For example, when the lithium secondary battery 1 is repeatedly charged and discharged, at least a portion of the electrolyte contained in the first space 172 may be consumed.

In an embodiment, at least one of the first sub-unit 30 and the second sub-unit 40 may be movable at an inside of the first unit 10 in a direction in which a volume of the enclosed space 50 is reduced by an external force (e.g., the longitudinal direction of the first unit).

For example, as the first sub-unit 30 moves, at least one of the first sub-holes 34 is arranged to overlap at least one of the first holes 14 so that the enclosed space 50 may be opened. For example, as the second sub-unit 40 moves, at least one of the second sub-holes 44 is arranged to overlap at least one of the first holes 14 so that the enclosed space 50 may be opened.

For example, the supplementary electrolyte may flow through at least one of the first sub-holes 34 and the second sub-holes 44, at least one of the first holes 14, and the passage portion 176 to be discharged into the first space 172.

Hereinafter, an electrolyte replenishing mechanism according to exemplary embodiments will be described in more detail with reference to FIG. 8

Figure 8:
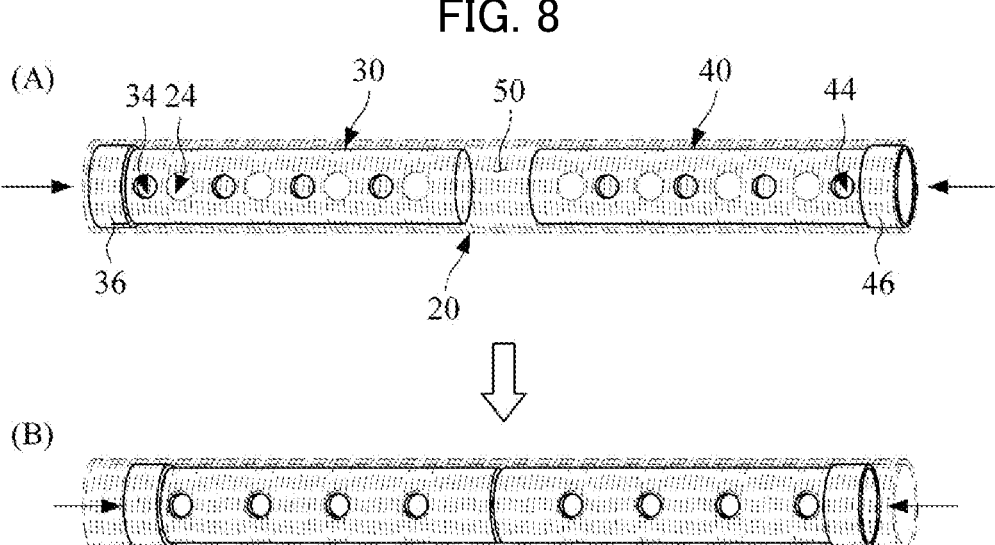
FIG. 8 is a diagram schematically illustrating a mechanism for opening an enclosed space formed by a second unit, a first sub-unit and a second sub-unit according to exemplary embodiments.

Referring to (A) of FIG. 8, the enclosed one end portion of the first sub-unit 30 and the enclosed one end portion of the second sub-unit 40 may each be disposed to face the outside of the case 160. The second holes 24, the first sub-holes 34 and the second sub-holes 44 may be arranged to be offset from each other, so that the enclosed space 50 may be formed in the second unit 20, the first sub-unit 30 and the second sub-unit 40. The supplementary electrolyte may be accommodated in the enclosed space 50.

Referring to (B) of FIG. 8, the first sub-unit 30 and the second sub-unit 40 may be moved at an inside of the second unit 20 in a direction in which a volume of the enclosed space 50 is reduced by an external force (e.g., the longitudinal direction of the second unit). Accordingly, the second holes 24 and at least one of the first sub-holes 34 and the second sub-holes 44 may overlap each other. Thus, the enclosed space 50 may be opened.

As illustrated in FIG. 6, the first holes 14 and the second holes 24 may overlap each other. Thus, when the enclosed space 50 is opened, the supplementary electrolyte may be moved to the first space 172 through the first holes 14 and the passage portion 176.

As described above, in the lithium secondary battery according to embodiments of the present invention, the electrolyte may be replenished while maintaining the airtightness of the first space 172. Accordingly, damages to the lithium secondary battery due to a permeation of external air and moisture when replenishing the electrolyte may be prevented.

Referring again to FIG. 1, in some embodiments, the passage portion 176 may include a sealing line portion 178. Accordingly, the airtightness of the first space 172 may be further improved. For example, the sealing line portion 178 may be opened by a discharging pressure of the supplementary electrolyte.

In an embodiment, the first unit 10 may have a first coefficient of thermal expansion, and the second unit 20 may have a second coefficient of thermal expansion different from the first coefficient of thermal expansion. For example, the coefficient of thermal expansion may be a linear expansion coefficient.

For example, if the electrolyte storage unit 5 may be exposed to a temperature equal to or lower than a predetermined temperature (e.g., −20° C. or less, preferably −30° C. or less) or higher than a predetermined temperature (e.g., 40° C. or higher, preferably 50° C. or higher).), a gap may be generated between the first unit 10 and the second unit 20. For example, the gap may be formed between the first unit 10 and the second unit 20 by cooling or heating the electrolyte storage unit 5 to the predetermined temperature.

For example, the second unit 20 may be physically separated from the first unit 10 by the gap. For example, the gap may not be formed at room temperature, and thus the second unit 20 may not be physically separated from the first unit 10 without damaging the first unit 10. For example, the sub-unit may also be separated from the first unit 10 together with the second unit 20.

In some embodiments, the second unit 20 may be physically separated from the first unit 10 at a temperature ranging from −30° C. to −20° C.

In some embodiments, the second unit 20 may be physically separated from the first unit 10 at a temperature ranging 40° C. to 50° C.

In an embodiment, a gap may be formed between the first unit 10 and the second unit 20 in which the supplementary electrolyte is consumed, so that the second unit 20 in which the supplementary electrolyte is consumed and the sub-unit may be separated from the first unit 10. The supplementary electrolyte may be newly charged in the second unit 20 where the supplementary electrolyte is consumed, and the second unit 20 may be inserted again into the first unit 10. In this case, the sealing line portion 178 may be reformed to maintain the airtightness of the first space 172.

Figure 9:
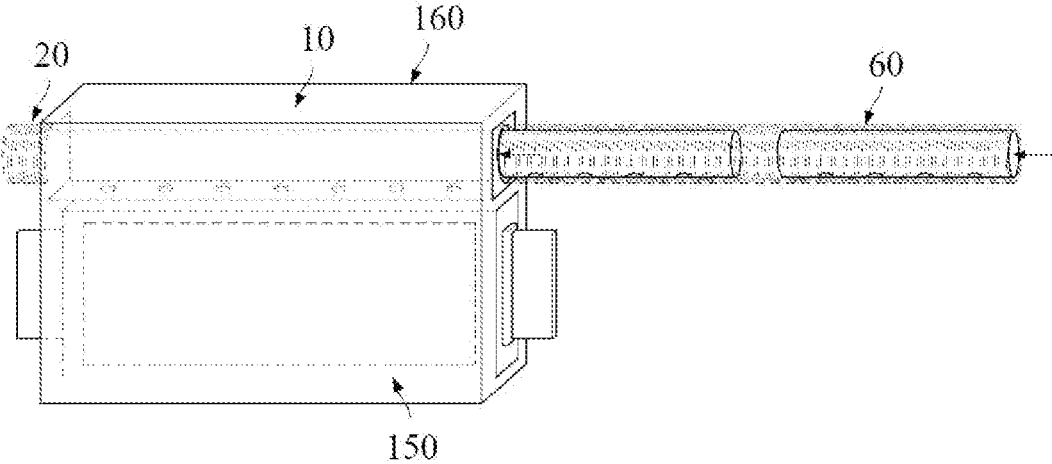
FIG. 9 is a diagram schematically illustrating a mechanism for replacing a second unit to a second sub-unit according to exemplary embodiments.

Referring to FIG. 9, in an embodiment, a replacement unit 60 including the second unit 20 filled with the supplementary electrolyte and the sub-unit may be additionally prepared and inserted into the first unit 10.

In exemplary embodiments, a gap may be formed between the first unit 10 and the second unit 20 in which the supplementary electrolyte is consumed. The replacement unit 60 may be inserted into the first unit 10, and the second unit 20 in which the supplementary electrolyte is consumed may be separated by being pushed from the first unit 10. The sub-unit may be separated from the first unit 10 together with the second unit 20. In this case, the replacement may be performed while maintaining the airtightness of the first space 172.

In some embodiments, the replacement may be performed under a low-temperature condition (e.g., −20° C. or less, or −30° C. or less) or a high-temperature condition (e.g., 40° C. or higher, or 50° C. or higher). Preferably, the replacement may be performed under the low-temperature condition. In this case, deformation of the electrolyte under the high temperature condition may be avoided.

In some embodiments, an absolute difference between the first coefficient of thermal expansion and the second coefficient of thermal expansion may be 5 μm/K or more, 10 μm/K or more, or 20 μm/K or more. Within the above range, the separation may be implemented without deterioration of the lithium secondary battery.

In some embodiments, the absolute difference between the first coefficient of thermal expansion and the second coefficient of thermal expansion may be 50 μm/K or less, 40 μm/K or less, or 30 μm/K or less. Within the above range, the airtightness of the first space 172 may be improved.

Within this range, penetration of external air and moisture into the first space 172 during the separation process may be effectively prevented.

A high-temperature environment may be created by a heat generation during repeated charging and discharging of the lithium secondary battery. In some embodiments, the second coefficient of thermal expansion may be greater than the first coefficient of thermal expansion. In this case, the gap between the first unit 10 and the second unit 20 may be formed at a low temperature, and the gap may not be formed at a high temperature. Accordingly, high-temperature durability of the electrolyte storage unit 5 may be improved.

In some embodiments, each of the first unit 10 and the second unit 20 may be formed of a metal such as stainless steel, copper, zinc, aluminum, manganese, tungsten, molybdenum, nickel, iron, silver, etc.; a polymer such as EP (Engineering plastic) and PET; and a ceramic such as $Al_2O_3$ and $TiO_2$. These may be used alone or in combination thereof In some embodiments, the first unit 10 may include stainless steel and the second unit 20 may include aluminum.

For example, the first unit 10, the second unit 20 and the sub-unit may include a material that may have a chemical resistance to the supplementary electrolyte (e.g., that nay not cause a side reaction with the supplementary electrolyte).

In some embodiments, the sub-unit may include a metal such as stainless steel, copper, zinc, aluminum, manganese, tungsten, molybdenum, nickel, iron, silver, etc.; a polymer such as EP (Engineering plastic) and PET; and a ceramic such as $Al_2O_3$ and $TiO_2$. These may be used alone or in combination thereof.

In some embodiments, the sub-unit may include stainless steel, aluminum, etc.

In some embodiments, an inner surface of the first body 12 and an outer surface of the second body 22 may include screw structures 16 and 26 that may be fastened to each other. In this case, the airtightness of the enclosed space 50 may be further improved.

In some embodiments, the second space 174 may be formed at the non-sealing portion 168. Accordingly, the electrolyte storage unit 5 may be easily attached and inserted to the second space 174. Additionally, durability against repeated attachment and detachment of the second unit 20 and the second sub-unit 40 may be obtained.

Figure 10:
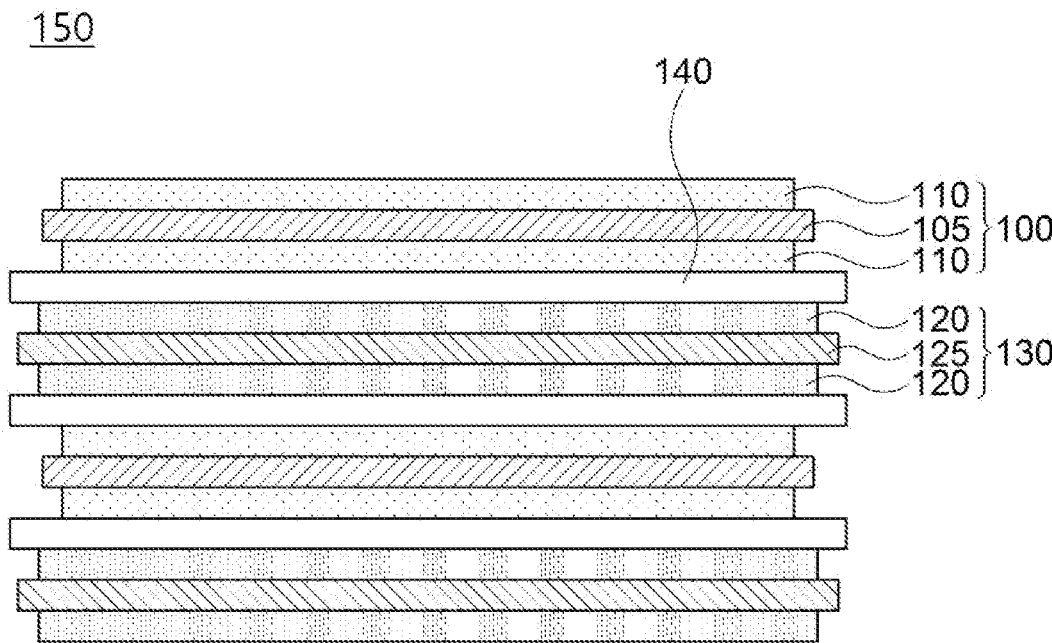
FIG. 10 is a schematic cross-sectional view of an electrode assembly according to exemplary embodiments.

Referring to FIG. 10, the electrode assembly 150 may include a cathode 100 and an anode 130 facing the cathode 100.

For example, the cathode 100 may include a cathode current collector 105 and a cathode active material layer 110 on the cathode current collector 105.

For example, the cathode active material layer 110 includes a cathode active material, and may further include a cathode binder and a conductive material.

For example, the cathode current collector 105 may include stainless steel, nickel, aluminum, titanium, copper, or an alloy thereof.

For example, the cathode active material may include a material capable of reversibly intercalating and de-intercalating lithium ions. For example, the cathode active material may include lithium metal oxide particles. For example, materials widely known in the related art may be used as the cathode binder and the conductive material without a particular limitation.

For example, the anode 130 may include an anode current collector 125 and an anode active material layer 120 on the anode current collector 125.

For example, the anode active material layer 120 includes an anode active material, and may further include an anode binder and a conductive material.

For example, the anode current collector 125 may include gold, stainless steel, nickel, aluminum, titanium, copper, or an alloy thereof.

For example, the anode active material may be a material capable of adsorbing and desorbing lithium ions. For example, the anode active material may include a lithium alloy, a carbon-based active material, a silicon-based active material, etc. For example, the anode binder and the conductive material widely known in the related art may be used without a particular limitation.

In some embodiments, a separation layer 140 may be interposed between the anode 100 and the cathode 130. For example, the separation layer 140 may include a material widely known in the related art without a particular limitation.

For example, the electrode assembly 150 may be formed by alternately and repeatedly stacking the cathode 100, the anode 130 and the separation layer 140. For example, the electrode assembly 150 may be formed by winding, lamination or z-folding of the separation layer 140.

Referring again to FIG. 1, the lithium secondary battery according to exemplary embodiments includes a cathode lead 107 connected to the cathode 100 and protruding to the outside of the cell case 160; and an anode lead 127 connected to the anode 130 and protruding to the outside of the cell case 160.

For example, the cathode 100 and the cathode lead 107 may be electrically connected. The anode 130 and the anode lead 127 may be electrically connected.

For example, the cathode lead 107 may be electrically connected to the cathode current collector 105. The anode lead 130 may be electrically connected to the anode current collector 125.

For example, the cathode current collector 105 may include a cathode tab protruding at one side thereof. The cathode active material layer 110 may not be formed on the cathode tab 106. The cathode tab 106 may be integral with the cathode current collector 105 or may be connected to the cathode current collector 105 by, e.g., welding. The cathode current collector 105 and the cathode lead 107 may be electrically connected via the cathode tab 106.

The anode current collector 125 may include an anode tab 126 protruding at one side thereof. The anode active material layer 120 may not be formed on the anode tab 126. The anode tab 126 may be integral with the anode current collector 125 or may be connected to the anode current collector 125 by, e.g., welding. The anode electrode current collector 125 and the anode lead 127 may be electrically connected via the anode tab.

For example, the electrode assembly 150 may include a plurality of the cathodes and a plurality of the anodes. For example, each of the plurality of the cathodes may include the cathode tab, and each of the plurality of the anodes may include the anode tab.

For example, the cathode tabs (or the anode tabs) may be laminated, pressed and welded to form a cathode tab stack (or an anode tab stack). The cathode tab stack may be electrically connected to the cathode lead 107. The anode tab stack may be electrically connected to the anode lead 127.

For example, the electrolyte solution and the supplementary electrolyte may include a lithium salt, an organic solvent, and may optionally further include an additive. For example, materials widely known in the related art may be used as the lithium salt, the organic solvent and the additive without a particular limitation.

Battery Module

Hereinafter, a battery module according to exemplary embodiments will be described in more detail with reference to the accompanying drawings. However, the drawings and embodiments are merely exemplary and illustrative, and the present invention is not limited thereto.

Figure 11:
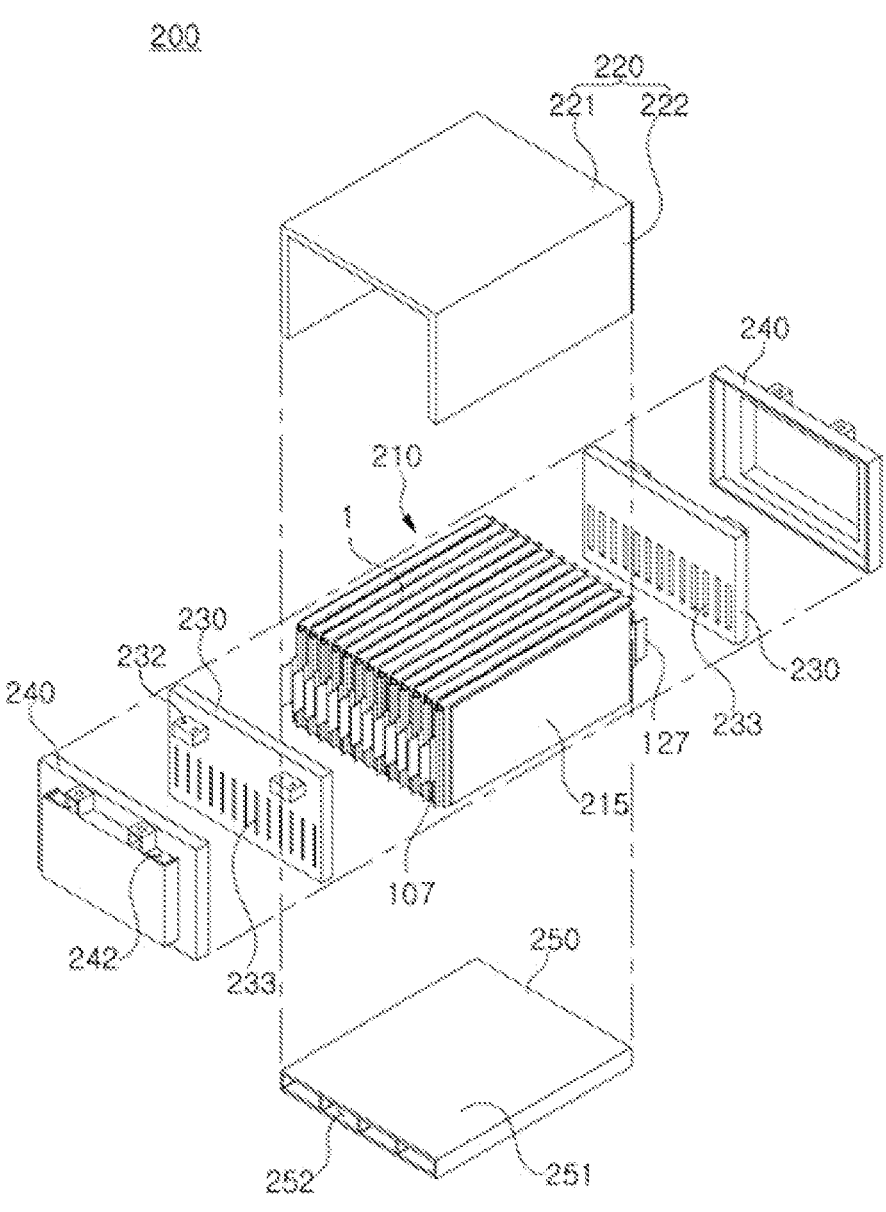
FIG. 11 is a schematic exploded perspective view of a battery module according to exemplary embodiments.

Referring to FIG. 11, a battery module 200 according to embodiments of the present invention may include a cell stack 210, a module case 220 and a cooling unit 250.

For example, the cell stack 210 may include a plurality of the battery cells 1 as described above. For example, the battery cells 1 may be stacked in a horizontal (or a vertical) direction at an inside of the module case 220 to form the cell stack 210.

The module case 220 may at least partially accommodate the cell stack 210. In an embodiment, the module case 220 may include a U-shaped plate and a flat plate which may be combined with each other to form a space at an inside thereof. The U-shaped plate may have a cross-section with one side being opened, for example, a U-shaped cross-section (in this specification, the U-shaped cross-section may include a shape having an angular corner).

The module case 220 may include the U-shaped plate including an upper portion 221 and a lateral side portion 222, and may accommodate an upper surface and both lateral side surfaces of the cell stack 210.

In some embodiments, the module case 220 and the flat plate may be coupled to each other through the lateral side portion 222 at a lower side opposite to the upper portion 221. In this case, the cooling unit 250 may be coupled to the upper portion 221 or the flat plate.

In some embodiments, the module case 220 and the cooling unit 250 may be coupled to each other through the lateral side portion 222 at the lower side opposite to the upper portion 221.

In an embodiment, the battery module 200 may further include an insulating cover 230 and an end plate 240.

For example, the end plate 240 may be coupled to each of front and rear ends of the module case 220. The end plate 240 may form an exterior of the battery module 200 together with the module case 220.

In an embodiment, the end plate 240 may include a through hole 242 configured to expose a connection terminal 232 of the insulating cover 230 to an outside. The end plate 240 may be coupled to the module case 220 by a fixing member such as a screw or a bolt.

In some embodiments, the insulating cover 230 may be interposed between the end plate 240 and the cell stack 210.

For example, the insulating cover 230 may be coupled to one side or both sides of the battery cell 1 where the electrode leads 107 and 127 are disposed. For example, the electrode leads 107 and 127 may pass through the insulating cover 230 to be interconnected at an outside of the insulating cover 230. For example, the insulating cover 230 may include the connection terminal 232 for connecting the battery cell 1 to the outside. For example, the electrode leads 107 and 127 may be electrically connected to the connection terminal 232 by a circuit wiring (not illustrated) provided in the insulating cover 230. For example, the circuit wiring may connect the battery cells 1 in series or in parallel by a bus bar (not illustrated).

The connection terminal 232 may be exposed to the outside by the through hole 242 formed in the end plate 240.

The through hole 242 of the end plate 240 may have a size and shape corresponding to that of the connection terminal 132.

For example, the insulating cover 230 may include a circuit board (e.g., a PCB) and an electronic device such as a sensor mounted on the circuit board.

In an embodiment, the cooling unit 250 may be disposed at one side of the cell stack 210 to cool the cell stack 210.

In some embodiments, the one side of the cell stack 210 may directly contact the cooling unit 250.

Figure 12:
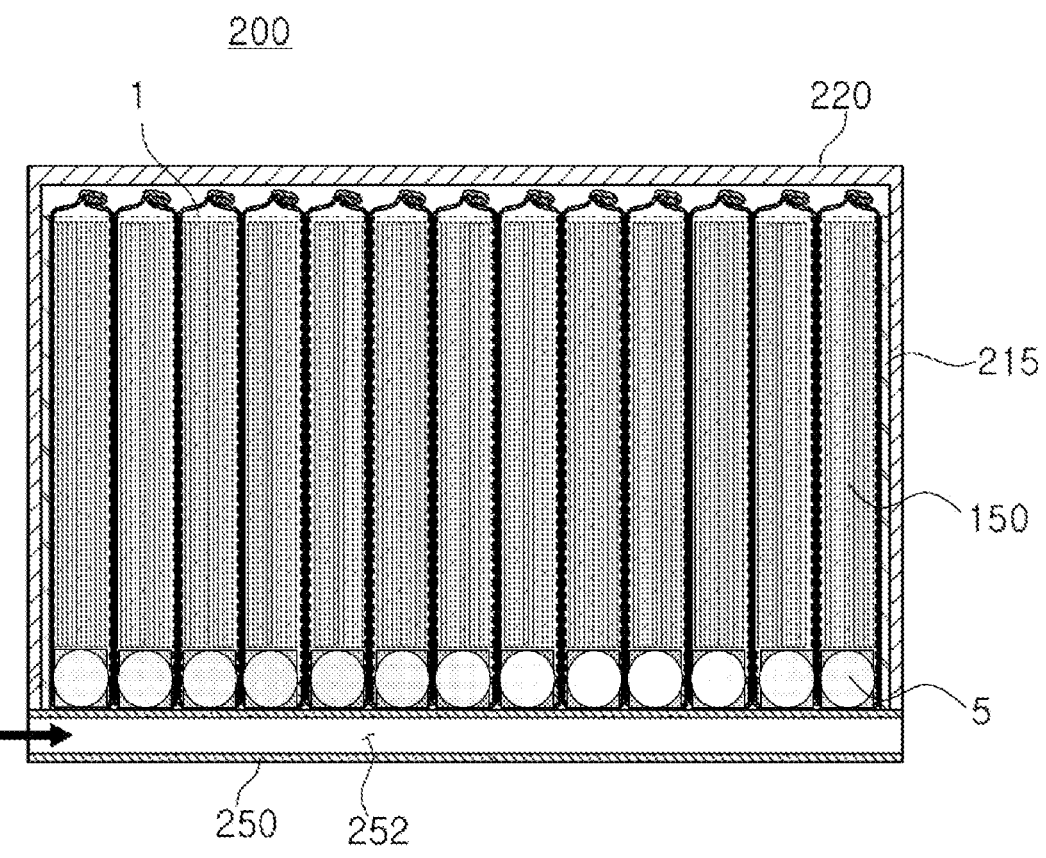
FIG. 12 is a schematic cross-sectional view of a battery module according to exemplary embodiments.

Referring to FIG. 12, the cooling unit 250 may include a cooling passage 252 through which a cooling fluid flows and a cooling plate 251. The one surface of the cell stack 210 may contact the cooling plate 251.

In an embodiment, as illustrated in FIG. 12, the battery cells 1 may be arranged so that the electrolyte storage unit 5 may be adjacent to the cooling unit 25.

For example, as illustrated in FIG. 12, the battery cells 1 may be disposed such that the electrolyte storage unit 5 may be disposed between the electrode assembly 150 and the cooling unit 250 in a cross-sectional view.

In an embodiment, at least a portion of the outer surface of the electrolyte storage unit 5 may include a flat region formed along the longitudinal direction of the electrolyte storage unit 5. For example, among outer surfaces of the electrolyte storage unit 5, an outer surface facing the cooling unit 250 may include a flat surface.

As described above, the electrolyte storage unit 5 may have the polygonal columnar shape. In some embodiments, the electrolyte storage unit 5 may have a quadrangular column shape.

For example, if the cell case 160 is a pouch type case, the electrolyte storage unit 5 may be inserted to contact the non-sealing portion 168 of the cell case 160. The non-sealing portion 168 may have a flat surface due to the flat outer surface of the electrolyte storage unit 5.

For example, as illustrated in FIG. 12, the outer surface of the electrolyte storage unit 5 facing the cooling unit 150 may have a flat surface and may be in a surface-contact with a bottom surface of the cell case 160. The bottom surface of the cell case 160 and a top surface of the cooling unit 250 may be in a surface-contact with each other.

For example, in a conventional pouch-type battery cell, a non-sealing portion may be recessed during folding of a pouch case or degassing of a cell. Accordingly, a surface-contact efficiency between the battery cell and the cooling unit, and cooling efficiency of the battery module may be degraded.

However, in the battery cell 1 according to the above-described embodiments, the non-sealing portion 168 may have a flat surface by the electrolyte storage unit 5. Thus, the surface-contact efficiency of the battery cell 1 and the cooling unit 250 may be enhanced, and the cooling efficiency of the battery module 200 may be further improved.

In some embodiments, as shown in FIG. 12, a surface of the electrode assembly 150 facing the electrolyte storage unit 5 may have a flat surface. Further, the outer surface of the electrolyte storage unit 5 facing the electrode assembly 150 may have a flat surface. Accordingly, the electrode assembly 150 and the electrolyte storage unit 5 may be in a surface-contact with each other.

What is claimed is:

1. A battery module, comprising:
a cell stack including a plurality of a battery cell;
a module case at least partially accommodating the cell stack; and
a cooling unit disposed at one side of the cell stack, wherein the battery cell comprises:

a cell case;

an electrode assembly and an electrolyte accommodated in the cell case; and an electrolyte storage unit inserted into the cell case to supply a supplementary electrolyte, the electrolyte storage unit being disposed between the electrode assembly and the cooling unit in a cross-sectional view, wherein the electrolyte storage unit comprises:

a first unit including a first body and first holes formed through the first body, the first body having an outer shape of a polygonal column and a tubular hollow structure; and a sub-unit comprising a tubular body and sub-holes formed through the tubular body, wherein the sub-unit is inserted into the first unit so that the sub-holes are offset from the first holes.

2. The battery module according to claim 1, wherein an outer surface of the electrolyte storage unit facing the cooling unit has a flat surface.

3. The battery module according to claim 2, wherein the flat surface of the electrolyte storage unit and a bottom surface of the cell case are in a surface-contact, and the bottom surface of the cell case and a top surface of the cooling unit are in a surface-contact in the cross-sectional view.

4. The battery module according to claim 3, wherein the bottom surface of the cell case is a non-sealing surface.

5. The battery module according to claim 1, wherein the electrolyte storage unit has a polygonal column shape.

6. The battery module according to claim 1, wherein a longitudinal direction of the electrode assembly and a longitudinal direction of the electrolyte storage unit are parallel.

7. The battery module according to claim 1, wherein the sub-unit comprises a first sub-unit and a second sub-unit which are inserted into both end portions of the first unit.

8. The battery module according to claim 7, wherein the first sub-unit and the second sub-unit are disposed in the first unit to be spaced apart from each other in a longitudinal direction of the first unit.

9. The battery module according to claim 8, wherein the first sub-unit and the second sub-unit are movable by an external force in the longitudinal direction so that at least one of the sub-holes overlaps at least one of the first holes.

10. The battery module according to claim 8, wherein the electrolyte storage unit further comprises:

a first packing unit coupled to one end portion of the first sub-unit; and a second packing unit coupled to one end portion of the second sub-unit.

11. The battery module according to claim 1, wherein the electrolyte storage unit further comprises a second unit that comprises a second body having a tubular structure and second holes formed through the second body, and the second unit is inserted between the first unit and the sub-unit so that at least one of the second holes overlaps at least one of the first holes.

12. The battery module according to claim 11, wherein the second holes are arranged to be offset from the sub-holes.

13. The battery module according to claim 11, wherein an inner surface of the first body and an outer surface of the second body have screw structures to be fastened to each other.

14. The battery module according to claim 11, wherein the first unit has a first coefficient of thermal expansion, and the second unit has a second coefficient of thermal expansion different from the first coefficient of thermal expansion.

15. The battery module according to claim 11, wherein the first unit has a first coefficient of thermal expansion, and the second unit has a second coefficient of thermal expansion different from the first coefficient of thermal expansion, wherein the second unit is physically separable from the first unit at a temperature of −20° C. or less, or 40° C. or higher.

16. The battery module according to claim 1, wherein the cell case comprises:

a first space accommodating the electrode assembly and the electrolyte;

a second space into which the electrolyte storage unit is inserted; and a passage portion through which the supplementary electrolyte is capable of being transferred between the first space and the second space.

17. The battery module according to claim 16, wherein the passage portion comprises a sealing line portion that is capable of being opened by a pressure due to a discharge of the supplementary electrolyte.

* * * * *